United States Patent [19]
Chen

[11] Patent Number: 5,288,793
[45] Date of Patent: Feb. 22, 1994

[54] FILLED MOLDING COMPOSITION COMPRISING POLYAMIDE HAVING TEREPHTHALAMIDE AND NAPHTHALAMIDE UNITS

[75] Inventor: Yu-Tsai Chen, Glen Ellyn, Ill.

[73] Assignee: Amoco Corporation, Chicago, Ill.

[21] Appl. No.: 816,766

[22] Filed: Jan. 2, 1992

Related U.S. Application Data

[63] Continuation of Ser. No. 585,875, Sep. 20, 1990, abandoned.

[51] Int. Cl.$^5$ ............................................. C08L 77/06
[52] U.S. Cl. ..................................... 524/606; 524/35; 524/607; 528/338; 528/339; 528/340; 528/344; 528/347
[58] Field of Search ............... 528/344, 338, 339, 340, 528/347; 524/606, 607, 35

[56] References Cited

U.S. PATENT DOCUMENTS

| | | | |
|---|---|---|---|
| 3,674,752 | 7/1972 | Ridgway et al. | 528/344 |
| 4,012,365 | 3/1977 | Moriyami et al. | 528/344 |
| 4,246,395 | 1/1981 | Mortimer | 528/338 |

Primary Examiner—Harold D. Anderson
Attorney, Agent, or Firm—Stephen L. Hensley

[57] ABSTRACT

Fiber- or particulate-filled polyphthalamide molding compositions, wherein the polyphthalamide comprises recurring units obtainable from terephthalic acid, 2,6-naphthalene dicarboxylic acid, aliphatic diamine and, optionally, isophthalic acid, exhibit a desirable combination of thermal, mechanical and solvent resistance properties.

12 Claims, No Drawings

FILLED MOLDING COMPOSITION COMPRISING POLYAMIDE HAVING TEREPHTHALAMIDE AND NAPHTHALAMIDE UNITS

This is a continuation, of application Ser. No. 07/585,875, filed Sep. 20, 1990, now abandoned.

This invention relates to filled polyamide molding compositions and, more particularly, to such compositions having a desirable combination of strength, stiffness, thermal properties, alcohol resistance, and low moisture absorbancies.

BACKGROUND OF THE INVENTION

Commonly assigned U.S. Pat. No. 4,603,166, issued Jul. 29, 1986, discloses polyphthalamide compositions which, when filled with glass fibers and molded, have heat deflection temperatures at 264 psi, determined according to ASTM D-648, above about 245° C. (473° F.). Included are compositions comprising recurring terephthalamide and adipamide or terephthalamide, isophthalamide and adipamide units and, preferably, wherein the mole ratio of dicarboxylic acid moieties provided by the terephthalamide, isophthalamide and adipamide units is about 65–90:25–0:35–5, respectively. As disclosed therein, such compositions, including particulate- and fiber-filled compositions, exhibit desirable thermal properties including heat deflection temperature, high tensile strength and flexural modulus and are useful in various applications including preparation of molded articles, fibers, and laminates.

Commonly assigned U.S. Pat. No. 4,617,342, issued Oct. 14, 1986, and commonly assigned, U.S. Pat. No. 4,863,991 issued Sep. 5, 1989, to Poppe et al., and published European Patent Application No. 84300745.1 (Publication No. 0122688), published Oct. 24, 1984, disclose polyphthalamides which, when filled with glass fibers, have heat deflection temperatures at 264 psi, determined according to ASTM D-648, above 240° C. Compositions according to U.S. Pat. No. 4,617,342 are prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Compositions taught in U.S. Pat. No. 4,863,991 are based on terephthalic acid and isophthalic acid compounds in a mole ratio of about 70:30 to about 99:1 and hexamethylene diamine. Such compositions have utility in various applications, the neat and fiber-filled compositions being particularly suited for molding applications.

For certain end uses it would be desirable to modify certain properties of filled polyphthalamides such as those described above. In particular, it would be desirable to provide melt processible filled polyphthalamide compositions with high strength and stiffness together with improved properties such as solvent resistance, especially to alcohols, thermal resistance and lower moisture absorption. Reduced moisture absorption is important because it can lead to better retention of mechanical properties by articles fabricated from filled polyamides when exposed to wet or humid environments, and, accordingly, more efficient use of fillers such as fibers included in the compositions as reinforcing materials. Such improvements would also lead not only to improved performance of products fabricated from such resins in existing end uses, but also utility in additional applications with more stringent requirements. Examples of specific applications for such polyphthalamides where the above improvements would be beneficial include many injection molding and engineering applications, such as electrical and electronic connections, pump housings, and automobile underhood and trim parts, especially those trim pieces which come in contact with windshield washer fluid or other fluids that contain alcohols which can cause cracking.

In general, it is known that modification of polymer properties may be achieved in various ways. Modification of the molecular structure of a given composition through the use of additional monomers in polymerization can lead to desirable improvements in some properties. However, the same often are accompanied by loss of other desirable properties and use of additional monomers is not always practical due to process considerations. Addition of other materials to a polymeric composition may lead to property improvements without complicating a polymerization process; however the effects of additives often are unpredictable and, again, improvements in some properties often are achieved at the expense of other properties. Blending a given polymer with one or more other polymers may give blends with combinations of properties intermediate those of the individual components; however, processing requirements often limit the number of candidates that can be blended with a given polymer in an attempt to attain desirable property modifications and properties of a blend may or may not reflect those of its components depending on compatibility of the components with each other, reactivity thereof under blending or processing conditions and other factors.

The use of 2,6-naphthalene dicarboxylic acid in the preparation of polyamides has been reported to result in improvements in certain properties. U.S. Pat. No. 4,246,395 to Mortimer, issued Jan. 20, 1981, discloses fiber-forming polyamides consisting of 45–75 mole % hexamethylene terephthalamide units, 20–40 mole % hexamethylene isophthalamide units and 5–20 mole % units derived from certain other dicarboxylic acids and diamines, examples of which include 1,3 or 1,4-cyclohexane-bis-methylamine or dodecamethylene diamine, dodecanedioic acid, 2,6-naphthalene dicarboxylic acid, 4,4'-oxydibenzoic acid or 1,4-cyclohexane dicarboxylic acid. The resulting polyamides are said to have improved thermal properties including glass transition temperature (>155° C.), melting points below 320° C. and better thermal stabilities. Mortimer also mentions that his polyamides can be used for molding applications. Filled polyamides are not disclosed.

U.S. Pat. No. 4,042,571 to Kawase et al., issued Aug. 16, 1977, discloses a process for preparing a fire retardant polyamide from at least one naphthalene dicarboxylic acid, including 2,7-naphthalene dicarboxylic acid and 2,6-naphthalene dicarboxylic acid, or its amide forming derivative or a combination of the two, a halogen-substituted mono- or dicarboxylic acid and an aliphatic diamine. Kawase et al. discloses that the naphthalene dicarboxylic acid is at least 40 mole % of the total acid component. According to the patent, additional dicarboxylic acid components can be used in an amount up to 55 mole % based on the total acid component. Aliphatic dicarboxylic acids such as adipic acid and aromatic dicarboxylic acids such as terephthalic acid and isophthalic acid are mentioned as examples of such additional acids. The acid component is polymerized with a diamine, including hexamethylene diamine. The disclosed polyamides can be formed into fibers, films and other shaped articles. In addition to enhanced fire retardancy, the disclosed compositions are said to show superior mechanical properties, chemical resistance, water resistance and thermal stability, especially when the amount of naphthalene dicarboxylic acid compound used in preparation of the composition is at least 40 mole % of the total acid component. This patent discloses that if the naphthalene carboxylic acid component is less than 40 mole % of the total acid component, the above properties are sacrificed.

U.S. Pat. No. 3,538,056 to Caldwell, issued Nov. 3, 1970, discloses high-melting linear polyamides prepared from an acid component of at least 60 mole % naphthalene dicarboxylic acid and branched chain diamines. According to the patent, these polyamides may be modified by inclusion in the acid component of up to 40 mole % of another dicarboxylic acid which may be aliphatic, aromatic or alicyclic, including isophthalic acid and terephthalic acid, and a diamine including hexamethylene diamine. Uses for these polyamides are said to include films, fibers and molded objects.

U.S. Pat. No. 4,012,365 to Moriyama et al., issued Mar. 15, 1977, discloses transparent polyamides prepared with 2,7-naphthalene dicarboxylic acid or its amide-forming derivative or a combination of the two, an aliphatic diamine component containing 4 to 13 carbon atoms and a comonomer component, which may be an aromatic dicarboxylic acid comonomer, including terephthalic, isophthalic or 2,6-naphthalene dicarboxylic acid, or a diamine component. The disclosed polyamides are said to have poor crystallinity, excellent transparency, high heat resistance and chemical resistance especially to methanol, ethanol, n- and isopropanol. The patent requires that the 2,7-naphthalene dicarboxylic acid or its amide-forming derivative or a combination of the two account for 50 to 100 mole % of the total acid component used in preparation of the polyamides, otherwise the polyamide has a reduced melting point and becomes easily soluble in alcohols. The disclosed polyamides can be melt shaped into films and fibers according to the patent.

U.S. Pat. No. 3,674,752 to Ridgway et al., issued Jul. 4, 1972, discloses fibers with increased resistance to loss in stiffness when subjected to conditions of heat and moisture and low shrinkage when subjected to hot or boiling water. The disclosed polyamides are derived from 80–90 mole % adipic acid, 10–20 mole % 1,6 or 2,6-naphthalene dicarboxylic acid and hexamethylene diamine.

U.S. Pat. No. 3,575,935 to Elam, issued Apr. 20, 1971, discloses polyamides useful as molding plastics derived from at least one aromatic or alicyclic dicarboxylic acid, including terephthalic, isophthalic and 2,6-naphthalene dicarboxylic acids, and 4,4-dimethyl-1,7-heptanediamine or 4-methyl-4-ethyl-1,7-heptanediamine or mixtures thereof. These polyamides are said to have improved heat distortion temperatures, impact strength and clarity.

Other patents which mention the use of 2,6-naphthalene dicarboxylic acid in preparation of polyamides include the following: U.S. Pat. Nos. 3,408,334; U.S. Pat. No. 3,467,623; U.S. Pat. No. 3,505,288; U.S. Pat. No. 3,639,358; U.S. Pat. No. 4,172,938 and U.S. Pat. No. 4,698,414.

Although the above patents disclose polyamides prepared from 2,6-and 2,7-naphthalene dicarboxylic acid, none discloses the invented filled compositions comprising a polyamide component comprising recurring units based on terephthalic acid, isophthalic acid and 2,6-naphthalene dicarboxylic acid and one or more aliphatic diamines and a fibrous or particulate filler material or the desirable thermal and mechanical properties together with improved solvent resistance exhibited by such compositions. Surprisingly, polyamide compositions of the present invention have excellent solvent resistance (especially alcohol resistance) even when the naphthalene dicarboxylic acid component is only 25 mole % of the total acid component, contrary to the 40–50 mole % required by some of the patents described above.

An object of this invention is to provide an improved polyamide composition. A futher object is to provide filled polyphthalamide compositions having utility in molding applications. A still further object of the invention is to provide filled polyphthalamide compositions with improved thermal properties, solvent resistance and less moisture absorption, resulting in improved retention of mechanical properties when used in applications involving exposure to wet or humid environments or alcohols.

DESCRIPTION OF THE INVENTION

The objects of this invention can be attained by providing an injection moldable composition comprising a crystallizable polyamide component comprising recurring units:

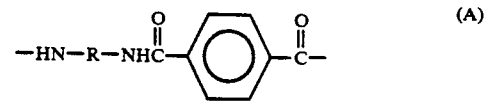

(A)

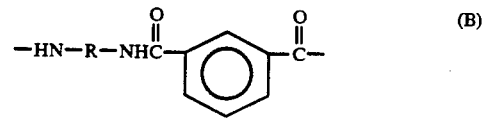

(B)

and

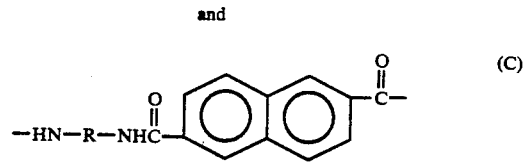

(C)

wherein R comprises a divalent aliphatic radical and the mole ratios of the dicarboxylic acid moieties of the A, B and C units is about 40–70:0–30:20–60, respectively, and a fibrous or particulate filler component. For purposes hereof, the dicarboxylic acid moieties of the units A, B and C are defined as follows:

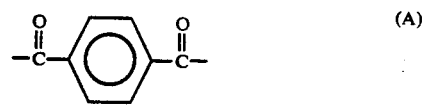

(A)

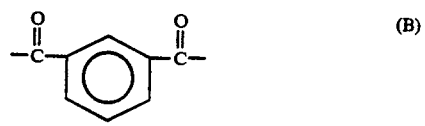

(B)

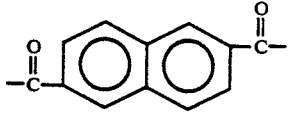 (C)

Such polyphthalamide compositions provide excellent mechanical properties, superior chemical resistance, especially to alcohols, and low moisture absorption in articles molded therefrom, together with low molding shrinkage. For example, some polyphthalamide compositions according to the invention are capable of retaining greater than 90% of their tensile strengths after exposure to methanol at 65° C. for 24 hours. By using less 2,6-naphthalene dicarboxylic acid to achieve superior chemical resistance, the present invention also provides a cost advantage as compared to filled polyamides comprising greater proportions of units based on 2,6-naphthalene dicarboxylic acid. In addition, these polyphthalamides are well suited for use in automobile exterior parts, especially trim pieces, which come in contact with alcohol (e.g. in windshield washer fluid) which can cause stress cracking.

The filled polyphthalamide compositions of the present invention also exhibit reduced water absorption. As such, these compositions have the added advantage of substantially retaining mechanical and thermal properties, such as tensile and flexural strengths, high heat deflection temperatures, and high glass transition temperatures, when wet. For example, glass fiber-filled polyphthalamide compositions of the present invention prepared from 50 mole % terephthalic acid and 50 mole % 2,6-naphthalene dicarboxylic acid and hexamethylene diamine can retain 95% of their tensile strengths after 5 days of exposure to boiling water.

In addition, the filled compositions of the present invention exhibit desirable properties such as improved tensile strength and flexural strength, high heat deflection temperatures and improved dimensional stability, properties useful for molding precision parts.

The polyphthalamide component of the invented compositions is a fast or intermediate crystallizing polyamide melting generally at about 280° to about 330° C. and having glass transition temperatures ("Tgs") of about 105° to about 140° C.

Referring to the formulas depicted above, R comprises a divalent aliphatic radical. Preferably, R comprises at least one divalent straight chain or cyclic aliphatic radical of about 4 to about 20 carbon atoms having up to one methyl substituent per carbon atom because the invented compositions comprising a polyphthalamide component containing such radicals exhibit a desirable combination of melt processibility and physical properties in articles prepared therefrom. Examples of such preferred radicals include tetramethylene, 2- and 3-methyl pentamethylene, hexamethylene, 2- and 3-methyl hexamethylene, 2,5-dimethyl hexamethylene, octamethylene, 1,2-, 1,3-and 1,4-cyclohexane, 3,3'-, 3,4'- and 4,4'-dicyclohexylmethane, dodecamethylene and combinations thereof. More preferably, R comprises octamethylene or hexamethylene because polyphthalamide compositions according to the invention containing such R groups often exhibit heat deflection temperatures at 264 psi of at least about 260° C. Best results are achieved when R is hexamethylene. The invented polyphthalamides also may contain units as represented by formulas A, B and C above but wherein R is replaced by one or more other types of divalent hydrocarbyl radicals such as a divalent aromatic radical, e.g., phenylene, meta- or para-xylylene, oxybisphenylene or methylenebisphenylene. The proportion of such units usually should not exceed about 20-30 mole percent as greater proportions can lead to sacrifices in melt processibility, crystallinity and other properties.

A preferred polyphthalamde component of the invented compositions comprises recurring units A, B and C, as represented above, in proportions such that the mole ratios of the dicarboxylic acid moieties in the units A, B and C is 45-65:0-20:25-55. The preferred ratios result in filled polyphthalamide compositions with fast crystallization rates, thereby resulting in faster molding cycles, high crystallinity, high glass transition temperatures and superior chemical resistance, especially to alcohols. In particular, the invented compositions comprising a polyphthalamide component wherein units A, B and C are present in such proportions and R in the above formulas is hexamethylene are particularly advantageous because they exhibit heat deflection temperatures at 264 psi according to ASTM D-648 of at least about 260° C. A particularly preferred composition according to the invention is that wherein the mole ratio of the dicarboxylic acid moieties of the units A, B and C is about 50:0:50.

The invented compositions also comprise a fibrous or particulate filler component. Fibrous fillers impart improved mechanical properties such as tensile strength and flexural modulus. Particulate fillers can also be used to obtain improvements in those properties, as well as to obtain compositions of increased density and lower cost. Combinations of such materials also can be used. Typically, amounts of such fibers or particulates range from about 10 to about 60 weight percent based on weight of the filled composition. Preferably, about 15 to about 50 weight percent of fibers or particulates is used to achieve desirable mechanical properties without substantial adverse affects on melt processibility. Representative fibers suitable as reinforcing agents include glass fibers, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool and wood cellulose fibers, etc. Representative filler materials include calcium silicate, silica, clays, talc, mica, carbon black, titanium dioxide, wollastonite, polytetrafluoroethylene, graphite, alumina trihydrate, sodium aluminum carbonate, barium ferrite, etc.

Fiber-filled compositions according to this invention are particularly desirable because they combine the desirable polyphthalamide properties with improvements in tensile and flexural strength, modulus and heat deflection temperature imparted by the fibers, making such polyphthalamide compositions particularly well suited as injection molding materials. Glass fibers are especially preferred for molding applications. Specific examples of glass fibers include alkali-free, boron-silicate glass or alkali-containing C-glass. Suitably, average thickness of the fibers is between about 3 and 30 microns. It is contemplated to use long fibers e.g., ranging from about 5 mm to about 50 mm, and also short fibers, e.g., from about 0.05 mm to about 5 mm. In principle, any standard commercial grade fiber, especially glass fibers, can be used.

Preferred glass fibers for injection molding applications have lengths of about 0.25 mm to about 25 mm.

While longer or shorter fibers are suitable, the former can be difficult to disperse in the polyphthalamide component, thereby lessening their reinforcing effect. Shorter fibers are easily dispersed but provide less reinforcement due to their low aspect ratio.

The fibers can be sized or unsized and may include a coupling agent to improve adhesion of the fibers to the polyphthalamide component. Commercially available glass fibers supplied with sizing agent applied thereto can be used as such or with the size removed, for example by abrasion. Sizing agents resistant to degradation or release of volatiles at temperatures employed in processing the invented compositions are preferred; examples include polyesters and polyester-urethanes. Examples of coupling agents include various silane, titanate and chromium compounds as known to those skilled in the art.

Compositions according to this invention also can contain pigments, stabilizers, flame retardants, nucleating agents, lubricants, impact modifiers and other suitable additives to improve or modify properties. Conventional additives include lubricants such as stearyl alcohol, metallic stearates and ethylene bisstearamide and heat stabilizers such as alkali metal halides and combinations thereof with copper salts and phosphorous acid, sodium or alkyl or aryl phosphates, and phosphites, various cupric salts of organic or inorganic acids, such as cupric acetate and butyrate, and alkali or alkaline earth metal halides, such as sodium iodide and potassium iodide.

The invented compositions also can be alloyed or blended with other thermoplastic resins, for example, other polyamides, polyesters, poly(aryl ether sulfones), polyarylene sulfides or oxides, polyamide-imides, polyetherimides, polyarylates, polycarbonates or combinations thereof to provide compositions with beneficial properties.

The polyphthalamide component of the invented compositions can be prepared from the appropriate starting materials, e.g., a dicarboxylic acid component comprising terephthalic acid, 2,6-naphthalene dicarboxylic acid and, if used, isophthalic acid, or their derivatives, and a diamine component comprising at least one aliphatic diamine or derivative thereof, in suitable proportions by any suitable means. The dicarboxylic acid component and diamine component are used in essentially stoichiometric quantities although a slight excess of either, e.g., up to about ten mole percent, can be used to account for loss of reactants or to provide final products with a predominance of acid or amine end groups as desired. One suitable preparation involves a salt preparation step, preferably conducted batchwise to achieve proper stoichiometry, wherein dicarboxylic acid and diamine components and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or continuously. In the condensation section substantial conversion of salts to polymer takes place. The condensation product then typically is introuded into a finishing section, such as a twin-screw extruder, to obtain further conversion and increase inherent viscosity from a level of about 0.1 to about 0.6 dl/g typically achieved in the condensation section up to about 0.8 dl/g or greater. The polymeric product can be recovered from the finishing section and, for example, pelletized or mixed with fillers, additives and the like. Commonly assigned U.S. Pat. No. 4,603,193, issued Jul. 29, 1986, and U.S. Pat. No. 4,831,108, issued May 16, 1989, both to Richardson et al. and incorporated herein by reference, also disclose suitable methods for preparation of such polyphthalamides by a process particularly suited for high melting polyamides. The process of the latter comprises forming an essentially homogeneous mixture of polyamide-forming starting materials, transferring the mixture to a heated preflash zone under pressure, passing the heated, pressurized mixture through an orifice into a zone of lower pressure and high heat flux to form an aerosol mist of reactants, passing the aerosol mist through the zone of high heat flux at low residence time and passing the resulting product to a finishing reactor to increase conversion thereof.

The filled compositions according to this invention can be prepared by combining components comprising the polyphthalamide component and the fibrous or particulate filler component by any suitable means. Conveniently, polyphthalamide component in powder, pellet or another suitable form is melt compounded with the filler component and any other additives or materials to be used in desired amounts, at a temperature effective to render the polyphthalamide component molten without degradation thereof, in a high shear mixer, e.g., a twin-screw extruder, to obtain substantially uniform dispersion of filler component and any other additives in the polyphthalamide. Use of kneading blocks or other suitable mixing elements in compounding aids in achieving a high degree of dispersion of the components. To minimize degradation of the polyphthalamide component, preferred temperatures when using a twin-screw mixer are equal to or up to about 20° C. greater than the melting point of the component. Mixing of the components in solid form prior to melt compounding can be conducted to facilitate melt blending. Fibers or particulates also can be incorporated by feeding the same to the molten polyphthalamide in an extruder or other compounding apparatus or by other suitable methods.

The invented compositions are particularly useful as injection molding compounds for production of molded objects, for example, chemical and refinery equipment components, computer parts, electronic connectors, switch components, pump housings, pulleys, valve components and automobile trim and under-the-hood parts. Injection molding of such compositions can be conducted using standard injection molding equipment. Injection molding can be accomplished by heating the invented compositions to above the melting point of the polyphthalamide component thereof but not so high as to substantially degrade the same, injecting the composition into a mold maintained at a temperature of about 5° C. or more above the glass transition temperature of the polyphthalamide component to about 30°-40° C. above such glass transition temperature and maintaining the composition in the mold for a time effective to solidify the composition. A 20 second to 1 minute cycle time, barrel temperatures ranging from about 290° to about 340° C. and mold temperatures of about 100° C. to about 150° C. are suitably employed with specific temperatures varying somewhat depending on melting point, degradation temperature and glass transition temperature of the polyphthalamide component.

The present invention is described further by the following examples. These examples are for the purpose of illustration and not limitation.

EXAMPLE 1

A polyphthalamide was prepared from terephthalic acid ("TA"), isophthalic acid ("IA") and 2,6-naphthalene dicarboxylic acid ("2,6-NDA") and hexamethylene diamine in mole ratios of about 60:15:25:103 as follows. To a large, stainless steel, stirred reactor having an oil jacket heating system, the reactants were added in the following quantities: 299.0 grams terephthalic acid, 74.8 grams isophthalic acid, 162.2 grams 2,6-naphthalene dicarboxylic acid, 482.0 grams hexamethylene diamine solution containing 25.5 weight percent water and 50 grams deionized water. The temperature controller was set at the maximum, 317° C. The agitator was set at 10 rpm. After about 43 minutes, the pressure in the reactor rose to about 120 psi and was held at this pressure for about 10 minutes as the temperature rose to about 289° C. Then the pressure was slowly vented down to atmospheric pressure in about 15 minutes and nitrogen sweep was applied. The temperature of the reactor contents rose to about 315° C. The current for the agitator started to increase to 1.89 from 1.78 amps and the polymer in the reactor was taken out and placed into water to stop the reaction. The cooled polymer was removed from the water and ground to about 3 mm in size and dried in a pumped vacuum oven at 110° C. (230° F.) and 0.35 mm Hg for 24 hours. Inherent viscosity (IV), determined at 30° C. on a 0.4 weight percent solution of the polymer, in a solvent of 60/40 w/w phenol/1,1,2,2-tetrachloroethane, was 1.34 dl/g. Filled compositions were prepared by physically mixing the dried polyphthalamide with commercially available 0.32 cm long glass fibers, identified as PPG 3540 from PPG Industries, Inc., in amounts sufficient to yield filled compositions containing 33 weight percent glass fibers based on weight of the filled compositions. Physical mixing was accomplished using a bucket tumbler. The filled compositions were then injection molded into test bars using an Arburg Injection Molding Machine operated as reported in the tables appearing below and otherwise as follows:

| | |
|---|---|
| Injection Pressure: | 21-42 kg/cm² |
| Holding Pressure: | 18-28 kg/cm² |
| Back Pressure: | 3.5-7 kg/cm² |
| Screw Speed: | 160-180 rpm |
| Injection Speed Setting: | 5 |
| Injection Time Setting: | 10 seconds forward, 20 seconds hold |
| Total Cycle Time: | 44 seconds |

Physical properties of the test bars were determined according to the following methods:

| | |
|---|---|
| Tensile Properties: (including Ultimate Tensile Strength ("UTS") and Elongation at Break): | ASTMD-638 (Type 1 test bars tested at 5 cm/minute) |
| Flexural Properties: | ASTM D-790 |
| Notched Izod Impact Strength: | ASTM D-256 |
| Tensile Impact Strength: | ASTM D-1822 (type S test bars were tested) |
| Heat Deflection Temperature: ("HDT") | ASTM D-648 |
| Water Absorption: | ASTM D-570 |
| Methanol Exposure: | ASTM D-543 |
| Glass Transition Temperature (Tg), Melting Temperature (Tm) and Melt Crystallization Temperature (Tc): | Pellets tested by Differential Scanning Calorimetry at 20° C./minute |

Test results are reported in Table 1. For purposes of comparison, test bars also were molded from the unfilled polyphthalamide and properties were tested. These are reported as Controls A-D in Table 1.

EXAMPLES 2-4

Following essentially the procedure of Example 1, three more samples of the 60:15:25 TA/IA/2,6-NDA-hexamethylene diamine polyphthalamide composition, with and without glass fibers, were prepared. Each of these samples was molded at 149° C., at least 10° C. higher than the glass transition temperature. The results are reported in Table 1. Inherent viscosities of these polyphthalamides were about 1.2-1.35 dl/g.

TABLE 1

| Example/Control | A | 1 | B | 2 | C | 3 | D | 4 |
|---|---|---|---|---|---|---|---|---|
| Glass (wt %) | 0 | 33 | 0 | 33 | 0 | 33 | 0 | 33 |
| YTS (kpsi) | NY[1] | NY | NY | NY | 16.6 | NY | NY | NY |
| Yld E (%) | NY | NY | NY | NY | 8.8 | NY | NY | NY |
| UTS (kpsi) | 13.6 | 29.4 | 13.4 | 32.3 | 12.9 | 32.2 | 11.3 | 32.2 |
| Elongation at Break (%) | 5.4 | 5.2 | 5.4 | 3.7 | 18.4 | 4.9 | 3.6 | 5.1 |
| Flexural Strength (kpsi) | NB[2] | 38.8 | NB | 44.1 | NB | 46.0 | NB | 45.5 |
| Flexural Modulus (kpsi) | 439 | 1202 | 447 | 1247 | 450 | 1360 | 445 | 1365 |
| Notched Izod (ft-lb/in) | 1.7 | 2.6 | 1.3 | 2.2 | 1.1 | 2.8 | 1.1 | 2.9 |
| HDT @ 264 psi (°C.) | 134 | 261 | 138 | 274 | 142 | 285 | 142 | 286 |
| HDT @ 66 psi (°C.) | 138 | — | 148 | — | — | — | — | — |
| Mold Temp (°C.) | 135 | 135 | 149 | 149 | 149 | 149 | 149 | 149 |
| Barrel Temp (°C.) | | | | | | | | |
| Rear | 310 | 310 | 321 | 321 | 310 | 310 | 310 | 310 |
| Front | 321 | 321 | 327 | 327 | 316 | 316 | 321 | 321 |
| Nozzle | 321 | 321 | 327 | 327 | 316 | 316 | 321 | 321 |
| Tg (°C.) | 138 | 138 | 134 | 134 | 132 | 132 | 137 | 137 |
| Tc (°C.) | 266 | 266 | 261 | 261 | 269 | 269 | 270 | 270 |
| Tm (°C.) | 309 | 309 | 306 | 306 | 306 | 306 | 309 | 309 |
| Hf (cal/g) | 15.2 | 15.2 | 12.6 | 12.6 | 13.5 | 13.5 | 11.7 | 11.7 |
| Td (°C.) | 388 | 388 | 421 | 421 | 413 | 413 | 421 | 421 |

[1] In this and subsequent tables, NY is used to indicate that there was no break or yield at 5% strain, indicating brittle failure.
[2] In this and subsequent tables, NB is used to indicate that there was no break or yield at 5% strain.

As can be seen from the above results, Examples 2-4 show an appreciable increase in heat deflection temperature over the same reported for Example 1. Examples 2-4 were molded at temperatures at least 10° C. above the glass transition temperature, allowing for better development of the heat deflection temperature. The fiber-filled samples of the invention (Examples 1-4) showed substantial increases in heat deflection temperatures ultimate tensile strength, flexural modulus and notched Izod impact strength over unfilled samples. (Controls A-D).

COMPARATIVE EXAMPLE I

For purposes of comparison a composition was prepared following essentially the procedure of Example 1, except that adipic acid was used in place of 2,6-naphthalene dicarboxylic acid. The terephthalic acid, isophthalic acid, adipic acid molar ratios were 60:15:25. Test bars molded at a mold temperature at least 10° C. above the glass transition temperature, from the neat and 33 wt % glass fiber-filled comparative compositions, were tested and the results are reported in Table 2.

TABLE 2

| Sample | A | B |
|---|---|---|
| Glass (wt %) | 0 | 33 |
| UTS (kpsi) | 11.0 | 28.6 |
| Elongation at Break (%) | 2.9 | 3.6 |
| Flexural Strength (kpsi) | 20.1 | 42.3 |
| Flexural Modulus (kpsi) | 534 | 1567 |
| Notched Izod (ft-lb/in) | 0.3 | 2.6 |
| HDT @ 264 psi (°C.) | 110 | 282 |
| HDT @ 66 psi (°C.) | 249 | — |
| Mold Temp (°C.) | 110 | 110 |
| Barrel Temp (°C.) | | |
| Rear | 307 | 310 |
| Front | 313 | 321 |
| Nozzle | 313 | 321 |
| Tg (°C.) | 96 | 96 |
| Tc (°C.) | 285 | 285 |
| Tm (°C.) | 305 | 305 |
| Hf (cal/g) | 14.9 | 14.9 |
| Td (°C.) | 370 | 370 |

EXAMPLE 5

Samples of the polyphthalamide compositions prepared and molded substantially according to Examples 2–4 were tested for solvent resistance according to the following procedure: specimens of the 60/15/25 TA-/IA/2,6 NDA compositions were immersed in acetic acid at 93° C. for 24 hours; in methanol at reflux (65° C.) for 24 hours and in a 28% concentrated solution of NH4OH at 93° C. for 24 hours. For comparison, neat and glass fiber-filled samples of commercial Nylon 6 and Nylon 66 resins and a polyphthalamide prepared from terephthalic acid, isophthalic acid and adipic acid in mole fractions of 65:25:10 and hexamethylene diamine were exposed to the same solvents and conditions. The results are reported in Table A.

TABLE A

| Sample | Glass wt % | Original UTS kpsi | % of Retained UTS in |||
|---|---|---|---|---|---|
| | | | Acetic Acid | Methanol | NH4OH |
| Nylon 6 | 0 | 12.5 | 0 | 32 | 31 |
| Nylon 66 | 0 | 12.3 | 0 | 14 | 13 |
| 65/25/10 TA/IA/AA | 0 | 12.5 | 41 | 54 | 78 |
| 60/15/25 TA/IA/2,6-NDA | 0 | 12.9 | 76 | 95 | 95 |
| Nylon 6 | 33 | 26.1 | 6 | 38 | 36 |
| Nylon 66 | 33 | 30.0 | 45 | 65 | 55 |
| 65/25/10 TA/IA/AA | 33 | 34.0 | 74 | 82 | 86 |
| 60/15/25 TA/IA/2,6-NDA | 33 | 32.2 | 88 | 93 | 94 |

In comparing the results in Table A above, the invented 60/15/25 TA/IA/2,6-NDA compositions show improved retention of tensile strength after exposure to the solvents relative to the other glass fiber-filled resins and far superior retention of ultimate tensile strength after exposure to methanol.

EXAMPLES 6-8 AND COMPARATIVE EXAMPLES 2-7

Following essentially the procedure of Example 1, a series of compositions was prepared with variations in mole fractions of terephthalic acid ("TA"), isophthalic acid ("IA") and 2,6-naphthalene dicarboxylic acid ("2,6-NDA") or 2,6-dimethyl naphthalene dicarboxylate ("DMNDC") as follows:

| | |
|---|---|
| Example 6 | 50/15/35 TA/IA/2,6-NDA |
| Example 7 | 50/50 TA/2,6-NDA |
| Example 8 | 50/50 TA/2,6-NDA |
| Example 9 | 65/25/10 TA/IA/2,6-NDA |
| Comparative Example 2 | 40/35/25 TA/IA/2,6-NDA |
| Comparative Example 3 | 60/40 IA/DMNDC |
| Comparative Example 4 | 60/40 IA/DMNDC |

Test bars were molded from each composition substantially according to the procedure of Example 1 and tested as described therein. Properties and molding conditions are reported in Tables 3 through 6. Properties of the unfilled polyphthalamides (Controls E through I) molded and tested in essentially the same manner also are reported in the tables. For purposes of comparison, compositions were also prepared following essentially the same procedure and with the same component mole fractions as in Examples 6–9 except that adipic acid ("AA") was used in place of the 2,6-naphthalene dicarboxylic acid compound. The results of these comparative examples (Comparative Examples 5–7) with respect to both neat and fiber-filled compositions also are reported in Tables 3 through 5.

TABLE 3

| | Example/Control ||||
|---|---|---|---|---|
| | Comp. Ex. 5 || | |
| | A | B | E | Ex. 6 |
| Composition | 50TA/15IA/35AA || 50TA/15IA/35 2,6-NDA ||
| Glass (wt. %) | 0 | 33 | 0 | 33 |
| UTS (kpsi) | 10.4 | 25.4 | 10.2 | 34.1 |
| Elongation at Break (%) | 2.9 | 3.4 | 3.8 | 5.4 |
| HDT @ 264 psi (°C.) | 110 | 276 | 149 | 274 |
| Mold Temp (°C.) | 104 | 104 | 135 | 135 |
| Barrel Temp (°C.) | | | | |
| Rear | 285 | 285 | 310 | 310 |
| Front | 293 | 291 | 316 | 316 |
| Nozzle | 293 | 291 | 316 | 316 |
| Tg (°C.) | 94 | 94 | 107 | 107 |
| Tc (°C.) | 237 | 237 | 251 | 251 |
| Tm (°C.) | 287 | 287 | 284 | 284 |
| Hf (cal/g) | 10.3 | 10.3 | 12.8 | 12.8 |
| Td (°C.) | 373 | 373 | 404 | 404 |

Following essentially the procedure of Example 5, samples of the 50/15/35 TA/IA/2,6 NDA polyphthalamide compositions from control E and Example 6 were tested for solvent resistance. The results are reported in Table B. The invented compositions (Example 6) showed superior tensile strength retention, especially after exposure to methanol and NH4OH, over the filled Nylon 6, Nylon 66 and comparative polyphthalamide samples.

TABLE B

| Sample | Glass wt % | Original UTS kpsi | % of Retained Tensile Strength in | | |
|---|---|---|---|---|---|
| | | | Acetic Acid | Methanol | NH4OH |
| Nylon 6 | 0 | 12.5 | 0 | 32 | 31 |
| Nylon 66 | 0 | 12.3 | 0 | 14 | 13 |
| 65/25/10 TA/IA/AA | 0 | 12.5 | 41 | 54 | 78 |
| Control E | 0 | 10.2 | 75 | 100 | 100 |
| Nylon 6 | 33 | 26.1 | 6 | 38 | 36 |
| Nylon 66 | 33 | 30.0 | 45 | 65 | 55 |
| 65/25/10 TA/IA/AA | 33 | 34.0 | 74 | 82 | 86 |
| Example 6 | 33 | 34.1 | 85 | 95 | 96 |

TABLE 4

| Example/Control Composition | Comp. Ex. 6 | | F* | Ex. 7 | G | Ex.8 |
|---|---|---|---|---|---|---|
| | A 50TA/50AA | B | | 50TA/50 | | 2.6-NDA |
| Glass (wt. %) | 0 | 33 | 0 | 33 | 0 | 33 |
| YTS (kpsi) | NY | NY | NY | NY | 19.3 | NY |
| Yld E (%) | NY | NY | NY | NY | 9.1 | NY |
| UTS (kpsi) | 14.0 | 21.0 | 4.2 | 30.2 | 18.5 | 30.4 |
| Elongation at Break (%) | 6.6 | 3.3 | 1.2 | 3.4 | 12.3 | 4.6 |
| Flexural Strength (kpsi) | 20.1 | 32.0 | 11.6 | 45.1 | NB | 43.4 |
| Flexural Modulus (kpsi) | 449 | 1320 | 459 | 1461 | 480 | 1313 |
| Notched Izod (ft-lb/in) | 1.0 | 1.2 | 0.3 | 2.4 | 1.6 | 2.3 |
| HDT @ 264 psi (°C.) | 85 | 280 | 149 | >293 | 151 | >293 |
| HDT @ 66 psi (°C.) | 254 | — | 229 | — | 168 | — |
| Mold Temp (°C.) | 93 | 93 | 135 | 149 | 149 | 149 |
| Barrel Temp (°C.) | | | | | | |
| Rear | 304 | 304 | 310 | 321 | 321 | 321 |
| Front | 316 | 316 | 316 | 332 | 332 | 332 |
| Nozzle | 316 | 316 | 316 | 332 | 332 | 332 |
| Tg (°C.) | 76 | 76 | 136 | 136 | 136 | 136 |
| Tc (°C.) | 248 | 248 | 284 | 284 | 283 | 283 |
| Tm (°C.) | 289 | 289 | 324 | 324 | 322 | 322 |
| Hf (cal/g) | 17.7 | 17.1 | 17.3 | 17.3 | 13.7 | 13.7 |
| Td (°C.) | 342 | 342 | 400 | 400 | 385 | 385 |

*Inherent viscosity of this control was 0.58 dl/g; properties are not representative of higher inherent viscosity materials.

Tensile specimens of the Example 7 composition were molded to compare its hydrolytic stability with glass fiber-filled samples of a 65/25/10 TA/IA/AA-hexamethylene diamine polyphthalamide and Nylon 6, and Nylon 66 known commercially as Zytel 70G-33 and Capron 8233G, respectively. The percentage of retained tensile strength after 5 days of exposure to boiling water was used as a measurement because the hydrolytic stability study of each sample showed that water equilibrium was reached in less than 5 days of boiling the specimens. The test results are reported in Table C.

TABLE C

| Sample | Glass wt % | Tg °C. | Original UTS kpsi | After 5 days of Boiling Water | | |
|---|---|---|---|---|---|---|
| | | | | Ret'ned UTS | % of Ret'n | Water wt. % |
| Example 7 | 33 | 136 | 30.2 | 28.7 | 95 | 3.0 |
| 65/25/10 TA/IA/AA | 33 | 115 | 34.1 | 27.0 | 79 | 3.6 |
| Nylon 66 | 33 | 46 | 30.0 | 14.3 | 48 | 5.2 |
| Nylon 6 | 33 | 40 | 27.0 | 8.6 | 32 | 6.1 |

The above table shows that after 5 days the Example 7 composition absorbed the least amount of water and had the highest retained ultimate tensile strength and highest percent of ultimate tensile strength retention.

TABLE 5

| Example/Control Composition | Comp. Ex. 7 | | | | Ex. 9 |
|---|---|---|---|---|---|
| | A 65TA/25IA/10AA | B | H 65TA/25IA/10 | I | 2,6-NDA |
| Glass (wt. %) | 0 | 33 | 0 | 0 | 33 |
| UTS (kpsi) | 12.5 | 26.9 | 14.6 | 13.6 | 30.7 |
| Elongation at Break (%) | 3.8 | 3.6 | 5.3 | 5.0 | 4.1 |
| Flexural Strength (kpsi) | 22.6 | 42.5 | NB | NB | 44.5 |
| Flexural Modulus (kpsi) | 485 | 1448 | 468 | 444 | 1348 |
| Notched Izod (ft-lb/in) | 1.2 | 2.2 | 1.4 | 1.2 | 2.8 |
| HDT @ 264 psi (°C.) | 116 | 285 | 134 | 135 | 276 |
| HDT @ 66 psi (°C.) | 143 | — | 149 | 148 | — |
| Mold Temp (°C.) | 135 | 135 | 135 | 135 | 135 |
| Barrel Temp (°C.) | | | | | |
| Rear | 316 | 316 | 310 | 310 | 310 |
| Front | 321 | 321 | 321 | 321 | 321 |
| Nozzle | 321 | 321 | 321 | 321 | 321 |
| Tg (°C.) | 109 | 109 | 129 | 133 | 133 |
| Tc (°C.) | 273 | 273 | 255 | 257 | 257 |
| Tm (°C.) | 305 | 305 | 313 | 314 | 314 |
| Hf (cal/g) | 11.0 | 11.0 | 13.1 | 13.5 | 13.5 |
| Td (°C.) | 358 | 358 | 388 | 379 | 379 |

Table 6 shows test results for unfilled and glass fiber-filled compositions of Comparative Examples 2–4. The low values of heat of fusion and heat deflection temperature of the glass filled composition of Comparative Example 2 indicate that this was a slow crystallizing polymer poorly suited for injection molding applications. Lack of a well defined melting point and heat of fusion for Comparative Examples 3 and 4 indicate that they were amorphous compositions. These comparative examples illustrate that when the amount of isophthalic acid based units is 35 mole percent or greater, the result is an amorphous or slow crystallizing polyphthalamide, poorly suited for injection molding applications.

TABLE 6

| | Example | | | |
|---|---|---|---|---|
| | Comp. Ex. 2 | | Comp. Ex. 3 | Comp. Ex. 4 |
| | A | B | | |
| Glass (wt. %) | 0 | 33 | 0 | 45 |
| YTS (kpsi) | 13.6 | NY | 13.9 | — |
| Yld E (%) | 9.5 | NY | 7.5 | — |
| UTS (kpsi) | 9.9 | 30.1 | 13.6 | 32.1 |
| Elongation at Break (%) | 54.6 | 4.6 | 118 | 4.0 |
| Flexural Strength (kpsi) | NB | 41.1 | 21.2 | 49.7 |
| Flexural Modulus (kpsi) | 380 | 1292 | 434 | 1900 |
| Notched Izod (ft-lb/in) | 2.2 | 2.6 | 1.3 | 4.3 |
| HDT @ 264 psi (°C.) | 126 | 139 | 112 | 151 |
| Mold Temp (°C.) | 135 | 135 | 66 | 71 |
| Barrel Temp (°C.) | | | | |
| Rear | 310 | 277 | 277 | 277 |
| Front | 316 | 288 | 291 | 291 |
| Nozzle | 316 | 288 | 291 | 291 |
| Tg (°C.) | 113 | 113 | 131 | 139 |
| Tc (°C.) | 196 | 196 | — | — |
| Tm (°C.) | 263 | 263 | — | — |
| Hf (cal/g) | 3.4 | 3.4 | — | — |
| Td (°C.) | 406 | 406 | 350 | 385 |

I claim:

1. An injection moldable composition comprising (1) a crystallizable polyamide component comprising recurring units

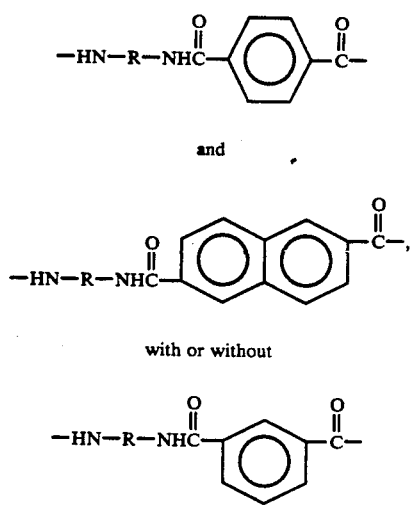

with or without wherein R comprises a divalent aliphatic radical and the mole ratios of the dicarboxylic acid moieties of the A, C and B units are 45–65:25–55:0–20, respectively, and (2) a fibrous or particulate filler material.

2. The composition of claim 1 wherein R comprises at least one divalent straight chain or cyclic aliphatic radical of about 4 to 20 carbon atoms having up to one methyl substituent per carbon atom.

3. The composition of claim 1 wherein the composition comprises about 10 to about 60 weight percent fibrous or particulate filler component based on weight of the filled composition, said filler selected from the group consisting of glass fibers, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool and wood cellulose fibers.

4. The composition of claim 3 wherein R comprises hexamethylene or octamethylene.

5. The composition of claim 3 wherein R is hexamethylene.

6. The composition of claim 3 wherein the mole ratios of the dicarboxylic acid moieties of the A, C and B units are about 50:50:0.

7. A molded object comprising the composition of claim 1.

8. An injection moldable composition comprising (1) a crystallizable polyamide component comprising recurring units

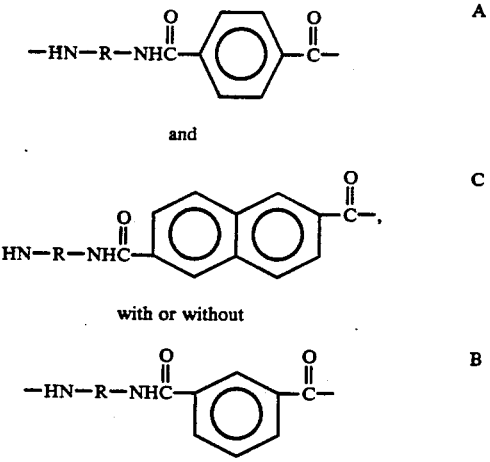

wherein R comprises a divalent aliphatic radical and the mole ratios of the dicarboxylic acid moieties of the A, C and B units are 45–65:25–55:0–20, respectively, and (2) a fibrous or particulate filler component comprising glass fibers.

9. An injection moldable composition comprising (1) a crystallizable polyamide component comprising recurring units

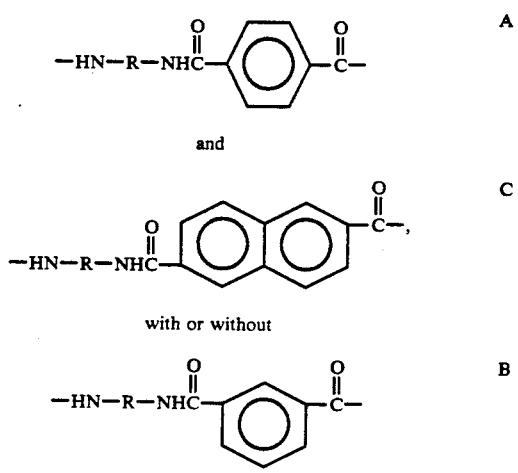

wherein R comprises hexamethylene and the mole ratios of the dicarboxylic acid moieties of the A, C and B units are 45–65:25–55:0–20, respectively, and (2) about 10 to about 60 weight percent of a fibrous or particulate filler component comprising glass fibers, based on weight of the filled composition.

10. The composition of claim 9 wherein the mole ratios of the dicarboxylic acid moieties of the A, C and B units are about 50:50:0.

11. A molded object comprising the composition of claim 10.

12. A molded object comprising the composition of claim 9.